United States Patent
Ghaleb et al.

(10) Patent No.: US 9,529,932 B2
(45) Date of Patent: Dec. 27, 2016

(54) XML NODE LABELING AND QUERYING USING LOGICAL OPERATORS

(71) Applicant: King Fahd University of Petroleum and Minerals, Dhahran (SA)

(72) Inventors: Taher Ahmed Ghaleb, Dhahran (SA); Salahadin Adam Mohammed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 496 days.

(21) Appl. No.: 14/163,473

(22) Filed: Jan. 24, 2014

(65) Prior Publication Data

US 2015/0213150 A1 Jul. 30, 2015

(51) Int. Cl.
*G06F 17/30* (2006.01)
*G06F 3/0482* (2013.01)

(52) U.S. Cl.
CPC ... *G06F 17/30911* (2013.01); *G06F 17/30864* (2013.01); *G06F 17/30961* (2013.01); *G06F 3/0482* (2013.01); *G06F 17/30958* (2013.01)

(58) Field of Classification Search
CPC .................. G06F 17/30911; G06F 17/30327; G06F 17/30864; G06F 17/30867; G06F 17/30958; G06F 3/0482; G06F 3/0489; G06F 17/30598
USPC .......................................... 707/797, 798, 800
See application file for complete search history.

(56) References Cited

U.S. PATENT DOCUMENTS

| | | | |
|---|---|---|---|
| 7,512,615 B2 * | 3/2009 | Bordawekar | G06F 17/30923 707/801 |
| 7,693,903 B2 * | 4/2010 | Potok | G06F 17/30569 707/727 |
| 7,783,976 B2 * | 8/2010 | Endo | G06F 17/2211 715/273 |
| 7,805,446 B2 * | 9/2010 | Potok | G06F 17/3071 707/737 |
| 8,156,156 B2 | 4/2012 | Ferragina et al. | |
| 2005/0028091 A1 * | 2/2005 | Bordawekar | G06Q 10/10 715/200 |

(Continued)

FOREIGN PATENT DOCUMENTS

KR 914311 B1 8/2009

OTHER PUBLICATIONS

Yun, Jung-Hee et al., "Dynamic interval-based labeling scheme for efficient XML query and update processing", The Journal of Systems and Software, 2008, p. 56-70. www.elsevier.com/locate/jss. Online: www.sciencedirect.com.*

(Continued)

*Primary Examiner* — Shahid Alam
(74) *Attorney, Agent, or Firm* — Oblon, McClelland, Maier & Neustadt, L.L.P.

(57) ABSTRACT

A method includes labeling XML document and determining the relationship between the nodes in the document by inputting data from a XML tree structure, visiting the nodes of the XML document by breath-first traversal in level order, assigning a label to each node in the form of <Level, Number>, where the level is the level where the node exists and the number is a unique identifying number generated by using a masking technique, creating a mask for each level, and storing the label and mask created for each level in the memory. The method further includes determining the relationship between nodes by using logical operators.

15 Claims, 8 Drawing Sheets

(56) References Cited

U.S. PATENT DOCUMENTS

2008/0010262 A1* 1/2008 Frank ................ G06F 17/30241
  707/704
2011/0099205 A1* 4/2011 Shmueli ............ G06F 17/30911
  707/797

OTHER PUBLICATIONS

Hye-Kyeong Ko, et al., "A Binary String Approach for Updates in Dynamic Ordered XML Data", Apr. 2009, Knowledge and Data Engineering, IEEE Transactions, vol. 22, Issue 4, (2 pages).
Changqing Li, et al., "Effcient updated in dynamic XML data: from binary strong to quaternary string", 2008, The VLDB Journal, (26 pages).

* cited by examiner

XML database document (Books.xml)
```
<Books>
 <Book>
   <Author> </Author>
   <Title> </Title>
   <Year> </Year>
 </Book>
 <Book>
   <Author>
     <LName> </LName>
     <FName> </FName>
   </Author>
   <Title> </Title>
   <Year> </Year>
 </Book>
 <Book>
   <Author>
     <LName> </LName>
     <FName> </FName>
   </Author>
   <Title> </Title>
 </Book>
</Books>
```

XML NODE LABELING AND QUERYING USING LOGICAL OPERATORS

BACKGROUND

1. Field of the Invention

The present disclosure relates generally to a method, an apparatus, and a computer-readable storage medium for labeling and querying XML documents to determine the relationships between nodes.

2. Description of the Related Art

Labeling is a process by which each node in a XML tree is given a label which holds information about that node, such as level, order or unique identifier in a way its position and also its relationship with other nodes is recognizable. Each node can be a parent, ancestor, child, descendant, or sibling of another node in the XML tree.

There are several available labeling schemes for XML trees. Examples of available labeling schemes are Range-based schemes, Prefix-based schemes, and Prime-based schemes. Range based labeling scheme identify each node with a label that consist of start number, end number and level according to the pre-order traversal of the XML tree. Prefix based labeling schemes store information of ancestors labels in the labels of their descendants using a delimiter, such as a ".". There are hybrid labeling schemes which combine the advantages of Range-based and Prefix-based labeling schemes. See S. C. Haw and C. S. Lee, "Extending path summary and region eEncoding for efficient structural query processing in native XML databases," Journal of Systems and Software (2009), hereby incorporated by reference in its entirety.

A Range labeling scheme, of the form (23, 44, 3), gives a node a label of the form (StartNo, EndNo, Level). This labeling scheme can determine the Parent-Child and Ancestor-Descendant relationships between two nodes using arithmetic range comparison operations. Conversely, sibling relationship cannot be identified from labels themselves. This labeling scheme is not applicable for dynamic XML documents since all nodes must be relabeled in case of insertion of a new node or a new subtree occurs.

J. H. Yun and C. W. Chung, "Dynamic interval-based labeling scheme for efficient XML query and update processing," Journal of Systems and Software (2008), hereby incorporated by reference in its entirety, proposed a range-based labeling scheme with a nested tree structure which eliminates the limitations and takes advantage of the previous interval-based node labeling schemes. Their approach supports XML data updates with almost no node relabeling. Also, the integer comparison operation is changed to the integer list comparison operation.

Other examples of Range-based labeling schemes are by P. F. Diets, "Maintaining order in a linked lists," ACM Symposium on Theory of Computing (1982), hereby incorporated by reference in its entirety, Q. Li and B. Moon, "Indexing and querying XML data for regular path expressions," VLDN (2001), hereby incorporated by reference in its entirety, and R. Thonangi, "A concise labeling scheme for XML data," COMAD 2006, Delhi, India (2006), hereby incorporated by reference in its entirety.

In a Prefix-based labeling scheme, of the form (1.3.22.4), a given node X is a descendant of a node Y if the label of Y is the prefix of the label of X. All the structural information of node relationships can be captured by looking only at the labels. This structural information requires large storage space for the labels. Alternatively, it efficiently identifies the ancestor-descendant, parent-child, and sibling relationships between tree nodes via string matching operations.

Dewey ID by I. Tatarinov et al., "Storing and querying ordered XML using a relational database system," ACM SIGMOD (2002), hereby incorporated by reference in its entirety, and Extended Dewey by J. Lu et al., "From region encoding to extended dewey: on efficient processing of XML twig pattern natching," VLDB 2005 (2005), hereby incorporated by reference in its entirety, are examples of prefix-based labeling schemes that are not capable of dynamic XML documents since both methods require relabeling of nodes if a new node is inserted.

Prefix based labeling schemes started with using only integers to represent labels, but afterwards, a combination of integers and alphabets have been used to represent node labels. In order to provide dynamic Dewey, new approaches were proposed. One proposal called "sibling labeling scheme" is by H. A. Al-Jamimi, A. Barradah, and M. Salahadin, "Siblings labeling Scheme for updating XML trees dynamically," International Conference on Computer Engineering and Technology (2010), hereby incorporated by reference in its entirety. Another proposal called "DDE" is by Liang Xu, Tok Wang Ling, Huayu Wu, Zhifeng Bao, "DDE: from Dewey to a fully dynamic XML labeling scheme," SIGMOD Conference (2009), hereby incorporated by reference in its entirety. The "sibling labeling scheme" approach requires relabeling of at most two nodes when a new node is inserted; whereas, DDE avoids relabeling completely.

Patrick O'Neil et al., "ORDPATHs: insert friendly XML node labels," ACM SIGMOD (2004), hereby incorporated by reference in its entirety, introduced OrdPath, which is a dynamic labeling scheme different from Dewey but of the same order. Node labels are assigned by the Dewey order except that it does not use even and negative integers in the initial labeling, of the form (1.5.7.9). It reserves even and negative integers for later insertions into an existing tree. Also it stores the label of each node as an encoded binary representation. The problem with OrdPath occurs when the size of the codes overflow, which means OrdPath must re-label all the existing nodes. For more about the overflow problem, see C. Li and T. W. Ling, "QED: A Novel quaternary encoding to completely avoid re-labeling in XML updates," CIKM (2005), hereby incorporated by reference in its entirety. The overflow problem effects other labeling schemes such as LSDX by M. Duong, and Y. Zhang, "LSDX: new labeling scheme for dynamically updating XML data," the $16^{th}$ Australian Database Conference, hereby incorporated by reference in its entirety, and SCOOTER by M. F. O'Connor and M. Roantree, "SCOOTER: a compact and scalable dynamic labeling scheme for XML updates," Springer-Verlag Berlin Heidelberg (2012), hereby incorporated by reference in its entirety. Thus, these labeling schemes are not preferred when XML documents have deep trees.

H. Ko and S. Lee, "A Binary String Approach for Updates in Dynamic Ordered XML Data," IEEE Transactions on Knowledge and Data Engineering (2010), hereby incorporated by reference in its entirety, proposed IBSL "Improved Binary String Labeling" as a labeling scheme. Their labeling scheme uses Dewey order but uses bit-strings of the form (101.1.100.111), with full support for update without recalculation or relabeling. Alternatively, this scheme does not use the characteristics of binary numbers to do bits-matching, however, it uses string matching in order to identify the relationships between nodes.

B. G. Assefa and B. Ergenc, "Orderbased labeling scheme for dynamic XML query processing," CD-ARES 2012, LNCS 7465, pp. 287-301, 2012, International Federation for Information Processing (2012), hereby incorporated by reference in its entirety, proposed a dynamic OrderBased labeling scheme which optimizes the label size of every level. Their scheme proved efficient querying time when compared to Com-D by M. Duong and Y. Zhang, "Dynamic labeling scheme for XML data processing," Meers-man, R., Tani, X. (eds.) OTM 2008, hereby incorporated by reference in its entirety. It also has an efficient label size with efficient storage requirement when compared to LSDX.

Many recent prefix-based labeling schemes which are based on Dewey structure, use compression and decompression techniques in order to minimize the label size and space requirement, but as a result query processing time suffers. Alternatively, some schemes try to play with the Dewey structure and shrink it, but consequently, in order to process queries, they consume much time to do it recursively.

SUMMARY

The present invention solves the above-identified needs, as well as others, by providing a new approach to labeling XML tree structures and using logical operators in querying to determine node relationships. This new approach to labeling and querying XML documents provides efficient label sizes, less storage requirements for labels, and provides faster querying processing times. The use of logical operators to determine node relationships has previously not been used amongst available labeling schemes. The present invention is also able to support updates in dynamic ordered XML data and reuse the deleted labels.

In the present invention, each node is assigned a label with the form <Level, Number> where the level is the level where the node exists and the number is a unique identifying number generated by using a masking technique. This masking technique creates a unique number for each node wherein the unique number is a combination of the parent's unique number and an additional number to differentiate the number from the node's siblings. The labeling scheme uses binary digits in a form of numbers. The concatenation of the parent's label as a mask of the child's label is done without the use of a delimiter.

This labeling technique allows logical operators to be used to querying the document and determine relationships between nodes. By using logical operators, such as the "Logic AND" operation, querying time is improved.

As should be apparent, a number of advantageous features and benefits are available by way of the disclosed embodiments and extensions thereof. It is to be understood that any embodiment can be constructed to include one or more features or benefits of embodiments disclosed herein, but not others. Accordingly, it is to be understood that the embodiments discussed herein are provided as examples and are not to be construed as limiting, particularly since embodiments can be formed to practice the invention that do not include each of the features of the disclosed examples.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figures 1, 2:
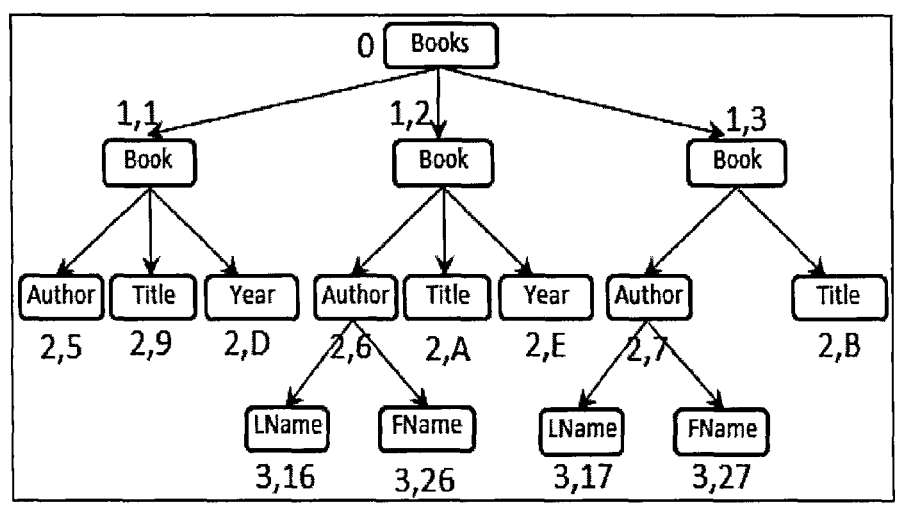
FIG. 1 is an example of a conventional XML database document.
FIG. 2 is an example of a conventional XML tree structure which corresponds to the XML database document of FIG. 1 where nodes are assigned labels using the labeling technique presented in this disclosure.

In the present invention, each node is assigned a label with the form <Level, Number> where the level is the level where the node exists and the number is a unique identifying number. The unique identifying number is generated by using a masking technique in subnetting. Subnetting is the process of dividing networks into one or more subnetworks. See J. D. Wegner and Robert Rockell, "IP addressing and subnetting, including IPv6," Syngress Media (2000), hereby incorporated by reference in its entirety. A difference between the technique applied in this invention and that in computer network subnetting is the size of numbers generated. The size of the numbers generated using our technique is dynamic in a way that the numbering starts with one bit for the first node (1), two bits for the second two nodes (10 and 11), and so on. Whereas, the size of the numbers generated using the technique in computer network subnetting is fixed in a way that all numbers has the same size (32 bits). For example, if a node is assigned the number 6, then this number is represented using 3 bits (110) in our technique, whereas in computer subnetting it is represented using 32 bits (00000000.00000000.00000000. 00000110). Another difference, is that in computer network subnetting, every node will have its own subnet mask (stored at each node), whereas in our technique all nodes of the same level will have one subnet mask (stored only once in memory).

FIG. 1 illustrates an example of a XML database document. A corresponding tree structure to FIG. 1 is illustrated in FIG. 2. The nodes in FIG. 2 are label in accordance to the present invention.

Figures 3, 4:
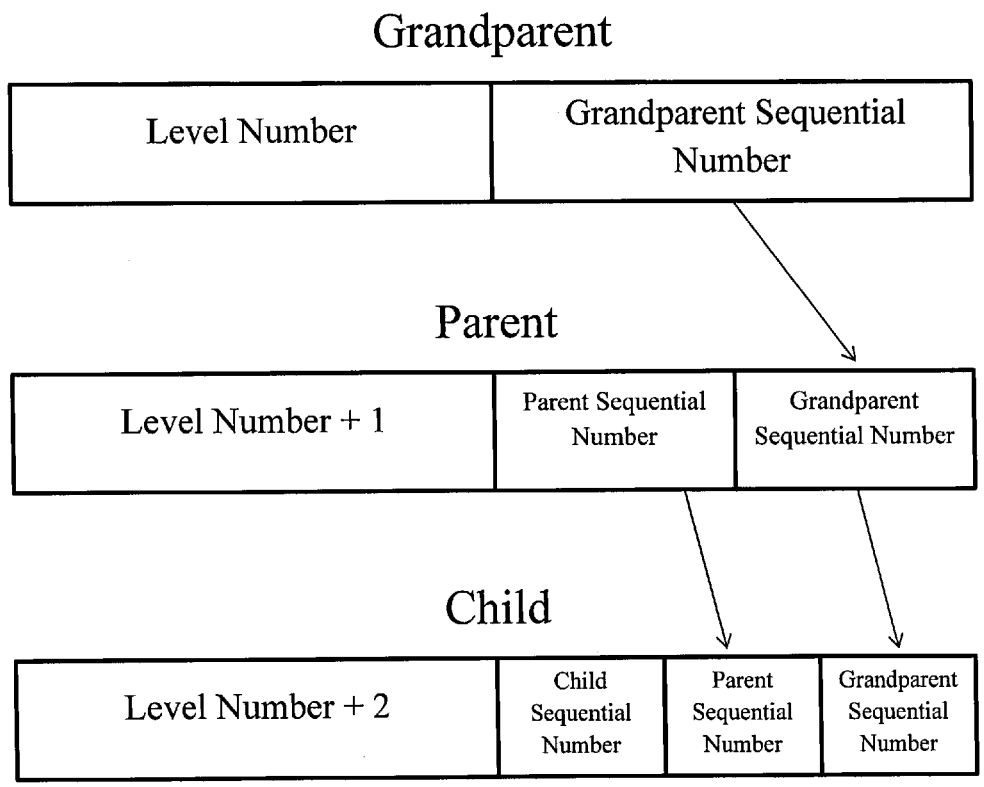
FIG. 3 is an example of how the masking technique creates unique identifying numbers that corresponds to parent unique identifying numbers.
FIG. 4 is a diagram that illustrates the masking technique of labeling multiple children nodes of a parent node.

FIG. 3 illustrates the concept of how the masking technique is used to create unique identifying numbers that correspond to the child's parent identifying number. The grandparent's label is in the form <Level, Number>. The number is a sequential binary number determined by the number of the siblings the grandparent has, and the sibling order. When the grandparent has a child (parent), the parent's unique number is a new sequential binary number concatenated with the grandparent's sequential number. The parent's sequential binary number is determined by the number of siblings the parent has. When the parent has a child (child), the child's unique number is a new sequential binary number concatenated with the parent's number. This process continues until all the nodes have been labeled in the XML document.

FIG. 4 illustrates an example of actual unique numbers. In the example, if we have a node number equals to $(16)_{hex}$ which represents the binary number 10110. Each one of the children's unique numbers are created by concatenating the parent's unique number with a sequential binary number in the order the children are found. Therefore, the labels of its children are generated as follows: 00110110, 01010110, 01110110, and 10010110 and so on. If the number of children is more than seven, then we have to use more than 3-bits to represent their sequence numbers. For example, if the same parent alternatively had eight children, 4-bits would be necessary to represent their sequence numbers. Therefore, its eight children's unique numbers would be as follows: 000110110, 001010110, 001110110, 010010110, 010110110, 011010110, 011110110, and 100010110.

Each level will have its own mask which is represented as by bits of 1s. The number of ones in a level mask is equal to the maximum number of bits used to represent labels at that level. Returning to FIG. 4, the parent number is equal to 10110 so the mask would be equal to 11111. Since there are four children, the maximum number at the child level is 10010110, and then the maximum number of bits is eight, so the mask must be 11111111.

Figure 5:
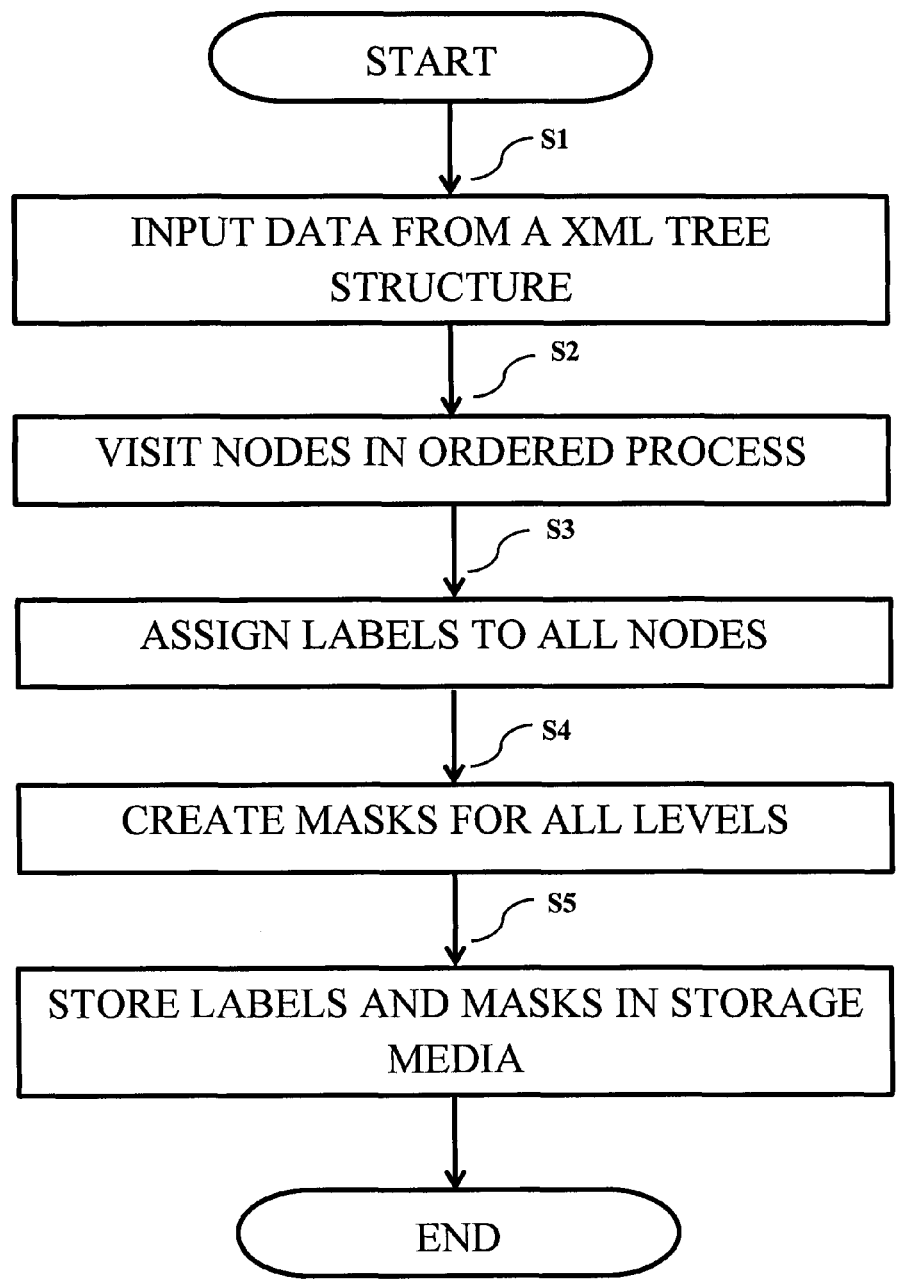
FIG. 5 is a flowchart illustrating how labeling the nodes of an XML document is done.

FIG. 5 is a flowchart of the node labeling method mentioned. The flowchart of FIG. 5 represents the steps taken to assign labels to each node in the XML document. In step S1, an XML document tree is inputted. In step S2, the nodes are visited in a systematic ordered process. The nodes could be visited in a number of different processes, such as depth-first or breadth-first. Examples of depth-first traversals are pre-order, in-order and post-order. In step S3, unique labels are assigned to each node. In step S4, a mask is created for each level of the XML tree. Finally, in step S5, all the labels and the masks for stored in a memory so they can be used to determine the relationships between the nodes.

Algorithm 1 is given as a possible way to code the method of labeling the nodes of FIG. 5. Algorithm 1 is used to label the nodes in the XML database document. Breadth first traversal is implemented by Algorithm 1 to visit all XML document nodes in level order. Each node is represented as structure of (Node_Number, Node_Level, Parent_Number) and is assigned a label of the form <Level, Number> where the Level is the level where that node is exist and the Number is a unique number generated using the masking technique. The labeling scheme starts generating labels for the nodes in the first level as follows: <1, 001>, <1, 010>, <1, 011>, <1, 100>, <1, 101> and so on. When no nodes available in the first level, the labeling scheme goes to the second level. Nodes at that level will be assigned labels which contains sequence numbers starting from 1 concatenated with their parent numbers, i.e., the label of the first child of the first parent is <2, 001>; and after concatenating it with its parent label it is going to be <2, 001001>, the second child will have the number <2, 010001> and so on. The number of zeros that are padded to the left of node label depend on the maximum of bits used to represent nodes' numbers at a given level. All labels are stored in disk by representing the Level using only one byte, and the Number is represented in hexadecimal. For example, a node with the label <3, 01010110> has the label <3, 56> where 56 is the hexadecimal representation of 01010110.

Algorithm 1. Generating labels

```
Input an XML document tree
Output computed labels for tree nodes
Begin
    01: lastLevel ← 0
    02: lastparent ← 0
    03: enqueue(XMLNode)
    04: while Queue.count > 0 do
    05:     currentnode ← dequeue( )
    06:     if lastLevel ≠ currentNodeLevel then
    07:         lastLevel ← lastLevel + 1
    08: //max. no. of bits used at that level is stored as a Mask,
    09: //e.g. 4 is stored as 1111
    10:     end if
    11:     if currentNodeParent ≠ lastparent then
    12:         number ← 1
    13:         lastparent ← currentNodeParent
    14:     end if
    15:     label ← currentNodeLevel number lastparent
    16:     // store label to disk
    17:     number ← number + 1
    18:     foreach ChildNode in currentnode.ChildNodes do
    19:         ChildNodeLevel ← currentLevel + 1
    20:         enqueue(ChildNode)
    21:     end for
    22: end while
End
```

Returning to FIG. 2 each node in the XML database document tree structure has been labeled according to the Algorithm 1. The first number represents the level, and the second number is the unique number converted to hexadecimal. For example, the label <2, 9> is on the second level, and its unique hexadecimal number is 9 which represents the binary number 1001. This node is the second child of the first parent. Another example is the label <3, 17>. The node is on the third level, and its hexadecimal number is 17 which represented the binary number 010111. This node is the first child of its parent. The parent is the first child of its parent. The parent is the third child of its parent.

Figure 6:
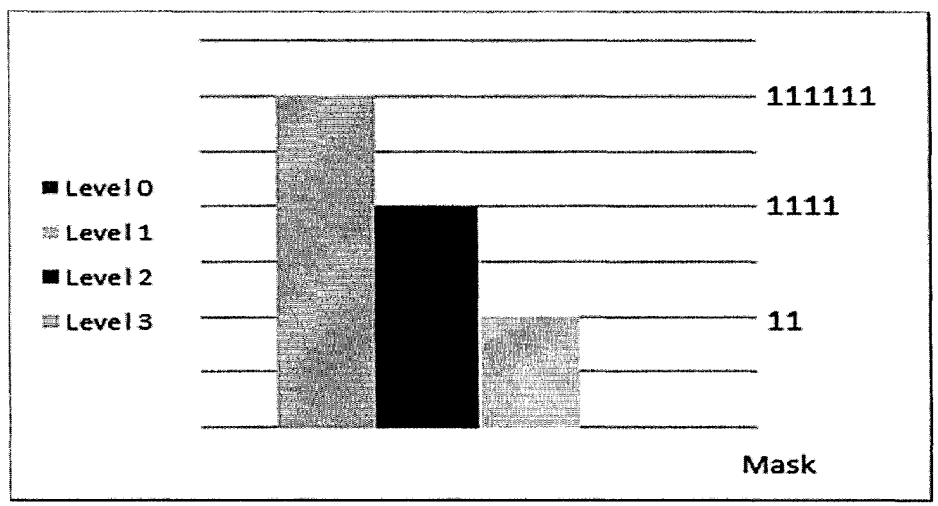
FIG. 6 is a graph illustrating the mask of each XML tree shown in FIG. 2.

Each level will have its own mask which is represented as by bits of 1s. Number of ones in a level mask is equal to the maximum number of bits used to represent labels at that level. For example, if the maximum Number at a given level is equal to 01011100101, then the maximum number of bits is eleven, so the mask must be 11111111111. The list of masks is stored in separated file in disk. FIG. 6 illustrates the masks created for each level of FIG. 2.

The labels generated using Algorithm 1 are efficient labels because they carry useful information about the relationships between nodes. An embodiment of the invention determines the relationship between two nodes using the logical AND operator.

Figure 7:
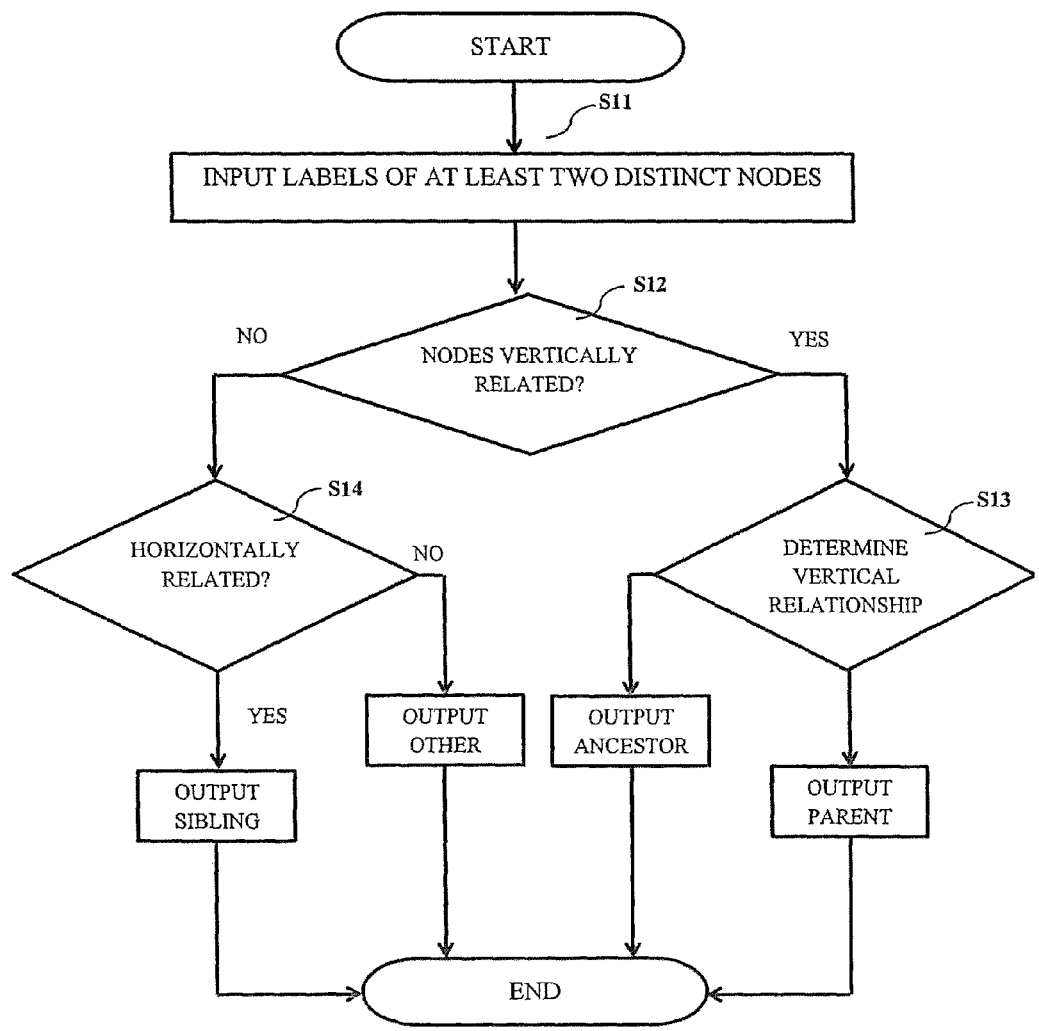
FIG. 7 is a flowchart illustrating how logical operators are used to query the relationship between nodes in an XML document.

FIG. 7 is a flowchart of the method of determining the relationship between nodes using the label created in FIG. 5. In step S11, the labels for at two nodes are inputted. Each label is in the form of <Level, Number>, where the level is the level where the node exists and the number is a unique identifying number generated in FIG. 5. In step S12, a logical operator is used to determine if the nodes are vertically related. If the nodes are determined to be vertically related, step S13 uses another logic operator is used to determine if the nodes have a parent-child relationship, or an ancestor-descendant relationship. If a parent-child relationship is determined, then "parent" is outputted. If an ancestor-descendant relationship is determined, then "ancestor" is outputted. If the nodes are not vertically related, step S14 uses another logical operator is used to determine if the nodes are horizontally related. If the nodes are horizontally related, "sibling" is outputted; otherwise "other" is outputted.

Algorithm 2 is given as a possible code to determine if node relationships in FIG. 7. Algorithm 2 illustrates the bits-matching technique in which the relationship between two nodes can be identified. Comparison using logical operators is well-known to be hardware based operation which is faster than integer comparison and string matching mechanisms.

---

Algorithm 2. Identifying Relationship between nodes

Input two nodes X, Y
Output the relationship between X and Y
Begin
    01: Mask ← Mask_of_X_level
    02: Mask1 = Mask of (X Level − 1)
    03: Mask2 = Mask of (Y level −1)
    04: if Y ∩ Mask = X then
    05:   if Level (Y) = Level (X) + 1 then
    06:     return Parent
    07:   else
    08:     return Ancestor
    09:   end if
    10: else if (Y ∩ Mask2 = X ∩ Mask1)
    11:   & (Level (Y) = Level (X)) then
    12:   return Sibling
    13: else
    14:   return other
    15: end if
End

---

The following is an example of how Algorithm 2 determines the relationship between two nodes. This example will use two nodes from FIG. 2. If the label of the node Book <1, 2> is used as Xnode, and the label of the node Fname <3, 26> is used as Ynode, Algorithm 2 can determine the relationship between the nodes. The unique number of the nodes is currently in hexadecimal, so when converted to binary, 2 become 10 and 26 become 100110. The mask for each node's level is given in FIG. 6. The mask for Xnode is 11, and the mask for Ynode is 111111. Now by applying Algorithm 2, Y∩Xlevel_mask=100110∩11=10 which is equal to Xnumber. This means that Xnode is either a parent or ancestor of Ynode. So, Xlevel+1 equals 2≈Ylevel, since the Ylevel is 3. This means that Xnode is an ancestor of Ynode.

Alternatively, if the label of the node Title <2, 9> is used as Xnode and LName <3, 17> is used as Ynode, Algorithm 2 can determine the relationship between the nodes. The binary conversion of 9 is 1001, and the binary conversion for 17 is 10111. The mask for Xlevel is 1111. Then Y∩Xlevel_mask=10111∩1111=111 which is not equal to Xnumber. This means that Xnode is neither a parent nor ancestor of Ynode. The mask for Xlevel−1 (i.e. level 1) is 11 and the mask for Ylevel−1 (i.e. level 2) is 1111. Hence, Y∩(Ylevel−1)_Mask=X∩(Xlevel−1)_Mask=10111∩1111≈ 1001∩11→111≈1, and also Xlevel≈Ylevel→2≈3, which also means that Xnode is not sibling of Ynode. However, if the label of the node Title <2, 9> is used as(node and LName <2, D> is used as Ynode, Algorithm 2 can determine the relationship between the nodes. The binary conversion of 9 is 1001, and the binary conversion for D is 1101. The mask for Xlevel is 1111. Then Y∩Xlevel_mask=1101∩1111=1101 which is not equal to Xnumber. This means that Xnode is neither a parent nor ancestor of Ynode. The mask for Xlevel−1 (i.e. level 1) is the same as the mask for Ylevel−1 (i.e. level 2) is 11. Hence, Y∩(Ylevel−1)_Mask=X∩(Xlevel−1)_Mask=1101∩11= 1001∩11→1=1 and also Xlevel=Ylevel→2=2, which concludes that Xnode and Ynode are of the same parent (i.e. they are siblings).

The present invention's performance in labeling and querying was compared against two other common labeling schemes: Dewey and Range (or Interval). The three labeling schemes were implemented in Visual C#2010 and C language. Implementation in Visual C# includes generating labels and calculating labels sizes using the three labeling schemes. Implementation in C language includes the binary matching which is used to identify the ancestor-descendant, parent-child and sibling relationships between nodes. Table I lists three real-world XML documents that are publically available online that were used in the comparison.

The experiments were applied on a 2.0 GHz Intel Core 2 Duo processor with 2 GB of RAM running 32-bit Windows 7 Ultimate.

TABLE I

DATASETS USED FOR TESTING

| Dataset | Topic | Max/average fan out | Max/average depth | # of nodes |
|---|---|---|---|---|
| D1 | DBLP | 328,858/65,930 | 6/3 | 3,332,130 |
| D2 | XMark | 25,500/3,242 | 12/6 | 1,666,315 |
| D3 | Treebank | 56384/1623 | 36/8 | 2,437,666 |

Specific categories were compared: label size (both average label size and maximum label size), memory space requirements for labels, and querying time to establish relationships between nodes.

Figure 8:
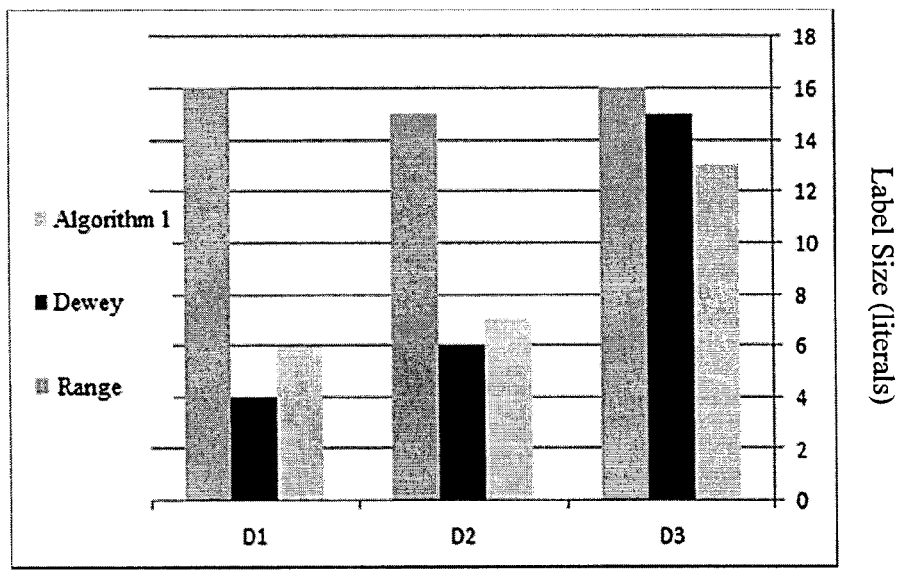
FIG. 8 is a graph illustrating an example of the average label size for different labeling techniques compared to the labeling technique according to Algorithm 1 after implementing them on different real world datasets presented in Table I.
Figure 9:
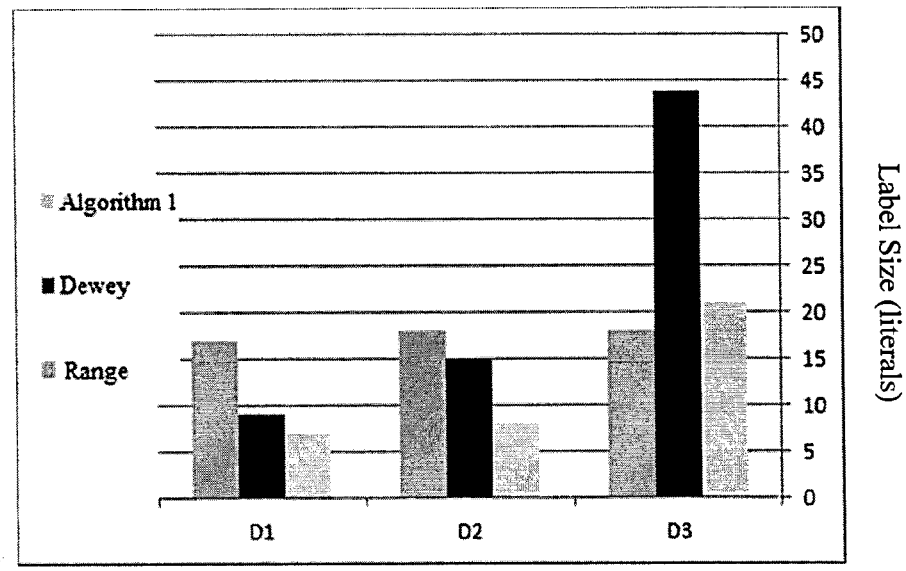
FIG. 9 is a graph illustrating an example of the maximum label size for different labeling technique compared to the labeling technique according to Algorithm 1 after implementing them on different real world datasets presented in Table I.

FIG. 8 is a graph that illustrates the average label size obtained after implementing the three labeling schemes on the three datasets shown in Table I. As shown, the Range labeling scheme average label size is nearly the same among the three datasets, which means that it is almost not affected by the depth of XML tree. Conversely, the average label size for Dewey depends on the depth of the XML tree. Average label size of Algorithm 1 is slightly affected by the depth of XML tree and seems to be closer to the Dewey. However, Algorithm 1 is more efficient than Dewey and Range because its maximum label tends to be smaller. FIG. 8 and FIG. 9 illustrate the average and maximum label size in terms of the number of literals used to represented labels. FIG. 9 is a graph that illustrates the maximum label size for each of the tree structures in Table 1 after being implemented by the three different labeling techniques.

Figure 10:
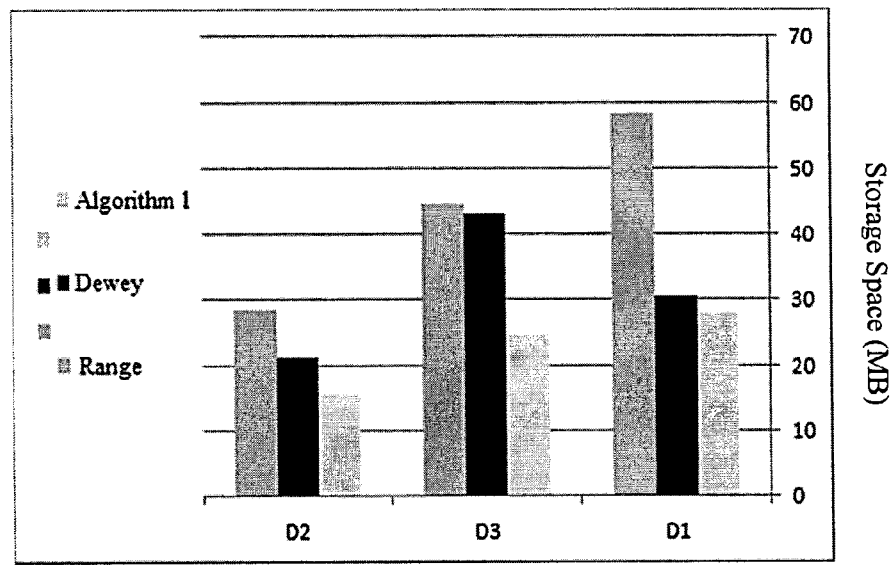
FIG. 10 is a graph illustrating an example of the space required to save labels of the different labeling techniques compared to the labeling technique according to Algorithm 1 after implementing them on different real world datasets presented in Table I.

FIG. 10 shows the space required to store labels of the three datasets using the labels generated by the three different labeling techniques. FIG. 10 illustrates the space require to store labels in megabytes. As it is demonstrated, Algorithm 1 provides efficient disk space required to store labels.

Figure 11:
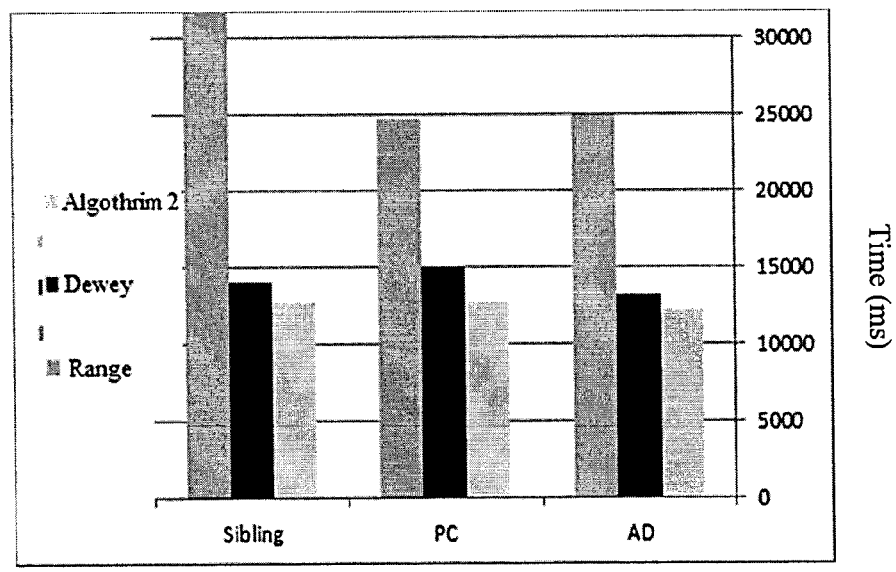
FIG. 11 is a graph illustrating an example of the time needed to determine the relationships between nodes of the different labeling techniques compared to the labeling technique according to Algorithm 2 after implementing them on different real world datasets presented in Table I.

FIG. 11 is a graph illustrating the average time to determine the relationships between nodes. The comparison was done by generating two files containing random labels created by each of the three labeling schemes. One file contained 100 labels and the other file contained 300,000 labels. A set of binary matching operations was used to identify the ancestor-descendant, parent-child and sibling relationship of the labels using the three different labeling techniques. FIG. 11 illustrates the average time in ms. As shown in FIG. 11, Algorithm 2 is more efficient and needs less time than either Dewey or Range labeling schemes.

Figure 12:
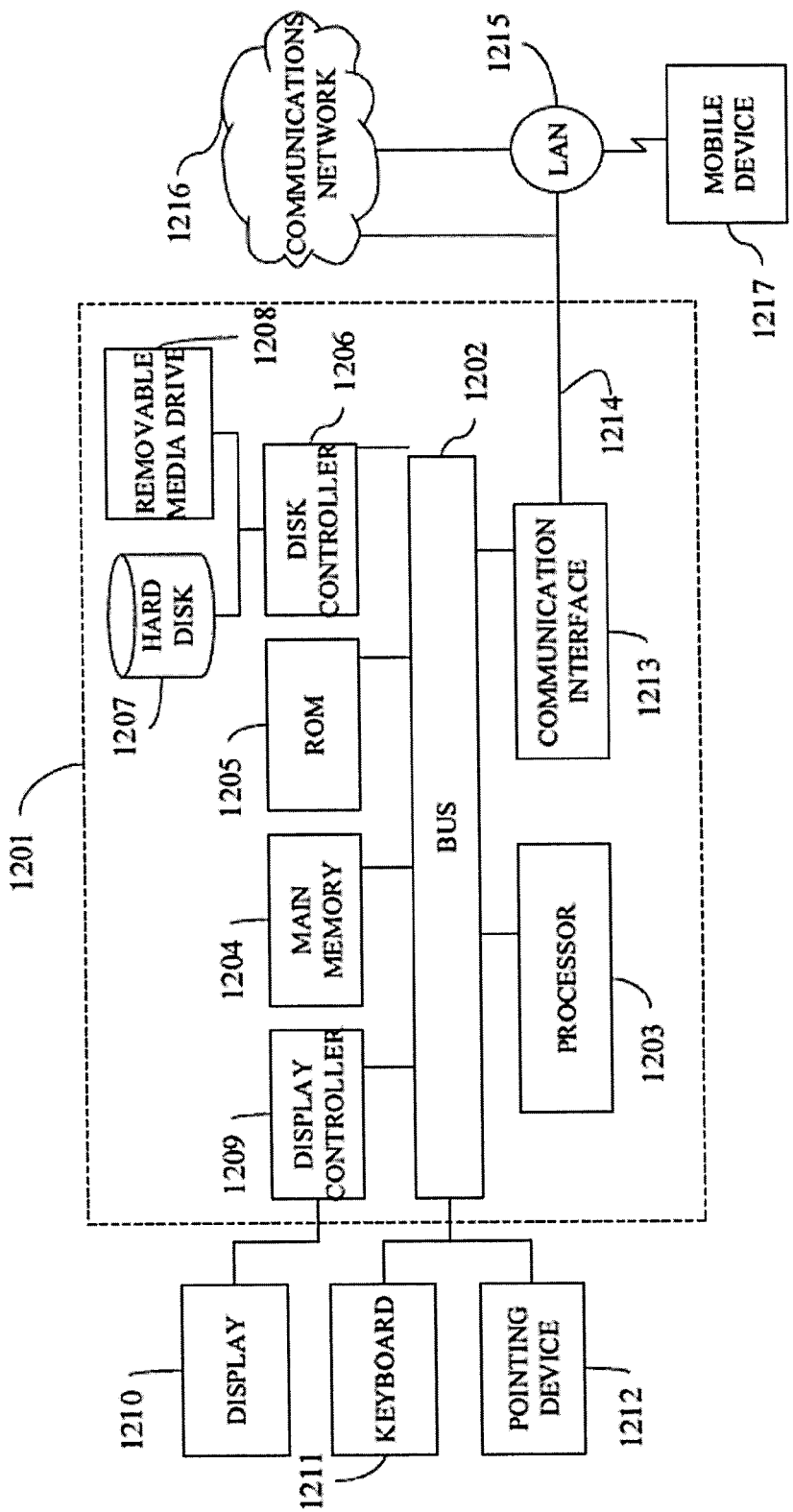
FIG. 12 is a block diagram of a computer system that may be employed according to the present disclosure.

FIG. 12 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Obviously, numerous modifications and variations of the present invention are possible in light of the above teachings. It is therefore to be understood that within the scope of the appended claims, the invention may be practiced otherwise than as specifically described herein.

What is claimed is:

1. A method of labeling and querying a XML document on a device that includes processing circuitry comprising:
   inputting data from a XML tree structure;
   visiting a plurality of nodes in the XML tree structure by breath-first traversal in level order;
   assigning a label to each node in the plurality of nodes in a first level wherein the first label includes a integer value for the first level, and a unique number that is a sequential binary number;
   assigning a subsequent label using the processing circuitry to each node of the plurality of nodes on subsequent levels where the node is a child of a parent node in a previous level, wherein the subsequent label includes a subsequent integer value of the level of the node where the node exists and a subsequent unique number is created by concatenating a subsequent sequential binary number and a parent's unique number;
   storing all the labels for the plurality of nodes in a memory;
   creating a mask for each level;
   storing the mask created for each level in the memory
   intersecting the mask of the stored level of a first node to the unique number of a second node;
   determining the intersection is equal to the unique number of the first node; and
   determining if the level of the first node plus one is equal to the level of the second node then output parent, otherwise output ancestor.

2. The method of labeling and querying a XML document of claim 1, further comprising:
   determining a relationship between at least two nodes using logical operators on the processing circuitry.

3. The method of labeling and querying a XML document of claim 1, wherein
   the labels for the plurality of nodes are stored in the memory as a bit for the level, and a hexadecimal for the unique number.

4. The method of labeling and querying a XML document of claim 1, wherein
   the mask created for each level is represented by bits of is equal to a maximum number of bits used to represent the unique number of the labels at each level.

5. The method of labeling and querying a XML document of claim 1 further comprising:
   determining that the intersection is not equal to the unique number of the first node and then intersecting the unique number of the second node and the mask of its previous level.

6. The method of labeling and querying a XML document of claim 5 further comprising:
   determining if the intersection of the unique number of the second node and the mask of its previous level is equal to the intersection of the unique number of the first node and the mask of its previous level, and
   determining if level of the second node is equal to the level of the first node then output sibling.

7. The method of labeling and querying a XML document of claim 6 further comprising:
   determining if the intersection of the unique number of the second node and the mask of its previous level is not equal to the intersection of the unique number of the first node and the mask of its previous level then output other.

8. The method of labeling and querying a XML document of claim 1 wherein the labels have small overhead space.

9. The method of labeling and querying a XML document of claim 1 wherein the labels have efficient label sizes.

10. The method of labeling and querying a XML document of claim 1 wherein querying has an efficient query processing time.

11. The method of labeling and querying a XML document of claim 1 wherein the labels are assigned using a subnetting technique.

12. A non-transitory computer-readable storage medium including computer executable instructions, wherein the instructions, when executed by a computer, cause the computer to perform a method, the method comprising:
inputting data from a XML tree structure;
visiting a plurality of nodes in the XML tree structure by breath-first traversal in level order;
assigning a label to each node in the plurality of nodes in a first level wherein the first label includes a integer value for the first level, and a unique number that is a sequential binary number;
assigning a subsequent label using the processing circuitry to each node of the plurality of nodes on subsequent levels where the node is a child of a parent node in a previous level, wherein the subsequent label include a subsequent integer value of the level of the node where the node exists and a subsequent unique number created by concatenating a subsequent sequential binary number and a parent's unique number;
storing all the labels for the plurality of nodes in a memory;
creating a mask for each level;
storing the mask created for each level in the memory;
intersecting the mask of the stored level of a first node to the unique number of a second node;
determining the intersection is equal to the unique number of the first nod; and
determining if the level of the first node plus one is equal to the level of the second node then output parent, otherwise output ancestor.

13. The non-transitory computer-readable storage medium according to claim 12, further comprising:
determining a relationship between at least two nodes using logical operators on the processing circuitry.

14. An apparatus comprising:
a display; and
a processing circuit configured to
input data from a XML tree structure;
visit a plurality of nodes in the XML tree structure by breath-first traversal in level order;
assign a label to each node in the plurality of nodes in a first level wherein the first label includes a integer value for the first level, and a unique number that is a sequential binary number;
assign a subsequent label to each node of the plurality of nodes on subsequent levels where the node is a child of a parent node in a previous level, wherein the subsequent label include a subsequent integer value of the level of the node where the node exists and a subsequent unique number created by concatenating a subsequent sequential binary number and a parent's unique number;
store all the labels for the plurality of nodes in a memory;
create a mask for each level; and
store the mask created for each level in the memory;
intersect the mask of the stored level of a first node to the unique number of a second node;
determine the intersection is equal to the unique number of the first node; and
determine if the level of the first node plus one is equal to the level of the second node then output parent, otherwise output ancestor.

15. The apparatus according to claim 14, wherein
the processing circuit determines a relationship between at least two nodes using logical operators.

* * * * *